United States Patent
Huth et al.

(10) Patent No.: US 11,757,527 B2
(45) Date of Patent: Sep. 12, 2023

(54) COLLISION-FREE TRANSMISSION OF SENSOR DATA OF MULTIPLE SENSORS TO A SATELLITE

(71) Applicant: Siemens Aktiengesellschaft, Munich (DE)

(72) Inventors: Hans-Peter Huth, Munich (DE); Florian Zeiger, Höhenkirchen-Siegertsbrunn (DE)

(73) Assignee: Siemens Aktiengesellschaft, Munich (DE)

( * ) Notice: Subject to any disclaimer, the term of this patent is extended or adjusted under 35 U.S.C. 154(b) by 13 days.

(21) Appl. No.: 17/619,694

(22) PCT Filed: Jun. 24, 2020

(86) PCT No.: PCT/EP2020/067714
§ 371 (c)(1),
(2) Date: Dec. 16, 2021

(87) PCT Pub. No.: WO2020/260398
PCT Pub. Date: Dec. 30, 2020

(65) Prior Publication Data
US 2022/0360324 A1  Nov. 10, 2022

(30) Foreign Application Priority Data

Jun. 27, 2019 (EP) .................... 19182804

(51) Int. Cl.
*H04B 7/212* (2006.01)
*H04B 7/185* (2006.01)
*H04B 7/204* (2006.01)

(52) U.S. Cl.
CPC ....... *H04B 7/2121* (2013.01); *H04B 7/18513* (2013.01); *H04B 7/2041* (2013.01)

(58) Field of Classification Search
None
See application file for complete search history.

(56) References Cited

U.S. PATENT DOCUMENTS

| 2017/0186307 | A1* | 6/2017 | Kim ................... H04L 67/12 |
| 2019/0173654 | A1* | 6/2019 | Mayer ................. H04W 80/02 |
| 2020/0160626 | A1* | 5/2020 | Lei ..................... G07C 5/0808 |

FOREIGN PATENT DOCUMENTS

EP       3748933  A1   12/2020

OTHER PUBLICATIONS

European Search Report for European Application No. 19182804.5-1219 dated Dec. 6, 2019.

(Continued)

*Primary Examiner* — Shripal K Khajuria
(74) *Attorney, Agent, or Firm* — Lempia Summerfield Katz LLC

(57) ABSTRACT

The disclosure relates to a method for transmitting sensor data from multiple sensors to a satellite. In a first phase, which is designated as a registration phase, the satellite registers the sensors in question and allocates each sensor a time window for transmitting the respective sensor data, and in a second phase, which is designated as a transmission phase, the satellite requests the sensor data in the individual sensors in a controlled manner, e.g., according to a list generated by the satellite during the registration phase. Thus, it is possible for satellites to access a ground-based sensor system in an optimized and self-learning manner. The disclosure additionally relates to a satellite suitable for carrying out the aforementioned method.

17 Claims, 2 Drawing Sheets

(56) References Cited

OTHER PUBLICATIONS

PCT International Search Report and Written Opinion of International Searching Authority dated Oct. 23, 2020 corresponding to PCT International Application No. PCT/EP2020/067714.
Zhou Haotian et al: "Coverage and Capacity Analysis of LEO Satellite Network Supporting Internet of Things"; ICC 2019-2019 IEEE International Conference on Communications (ICC). (May 20, 2019); pp. 1-6.
Wang Chaoyu et al: "SL-MAC: A Joint TDMA MAC Protocol for LEO Satellites Supported Internet of Things"; 2018 14th International Conference on Mobile AD-HOC and Sensor Networks (MSN). (Dec. 6, 2018); pp. 31-36.

* cited by examiner

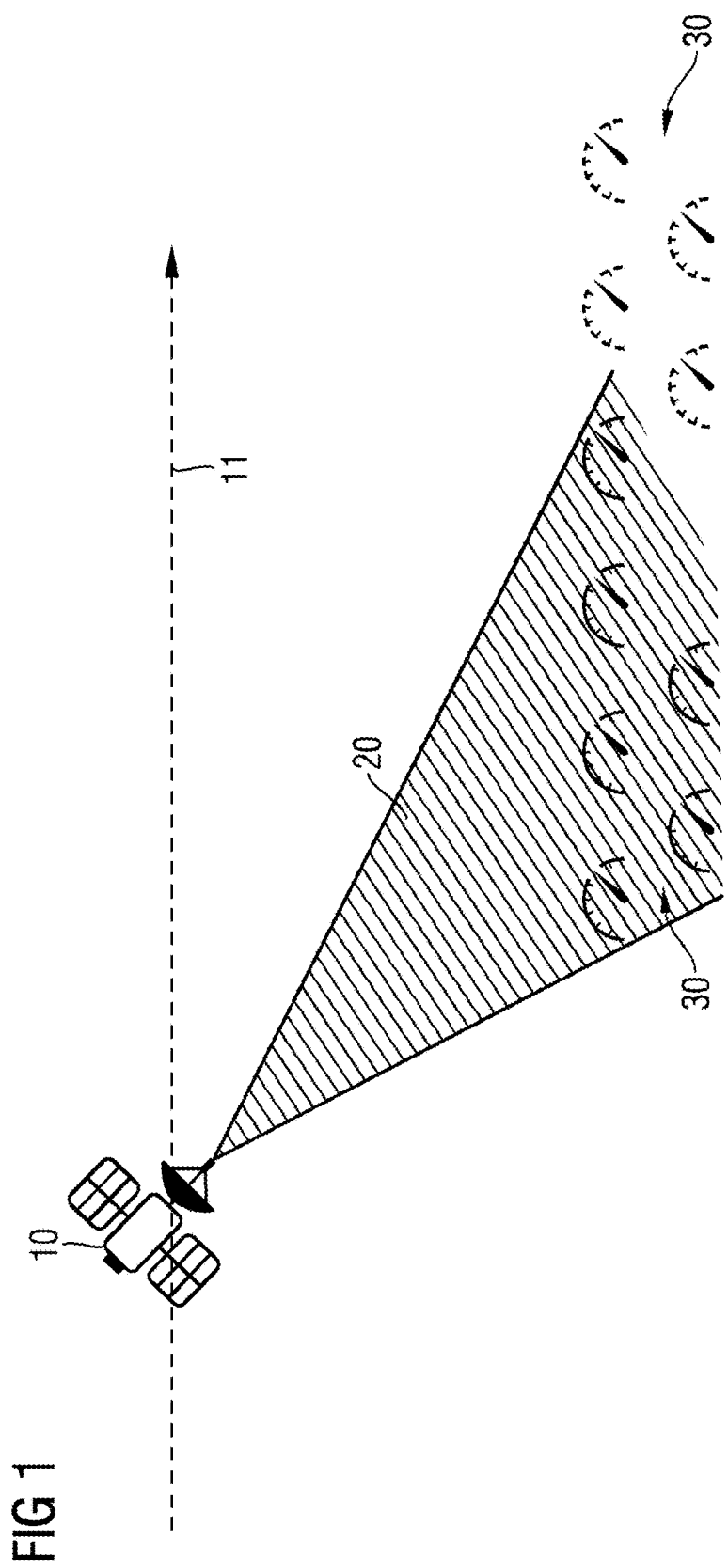

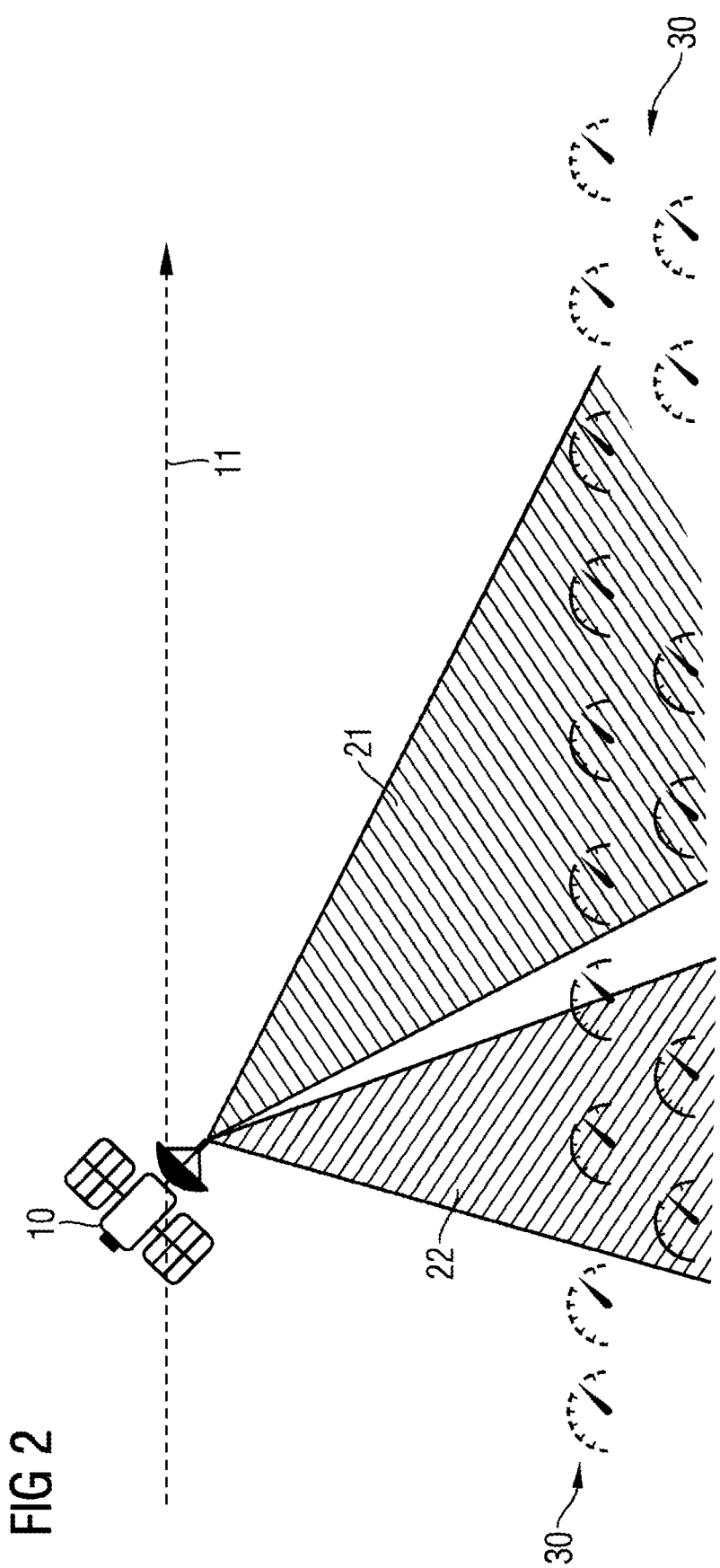

COLLISION-FREE TRANSMISSION OF SENSOR DATA OF MULTIPLE SENSORS TO A SATELLITE

The present patent document is a § 371 nationalization of PCT Application Serial No. PCT/EP2020/067714, filed Jun. 24, 2020, designating the United States, which is hereby incorporated by reference, and this patent document also claims the benefit of European Patent Application No. 19182804.5, filed Jun. 27, 2019, which is also hereby incorporated by reference.

TECHNICAL FIELD

The disclosure relates to a method for transmitting sensor data from multiple sensors to a satellite. Furthermore, the disclosure relates to a satellite suitable for carrying out the method.

BACKGROUND

The disclosure addresses the problem that, in particular in satellite-based IoT scenarios, a satellite is able to receive the sensor data of a plurality of terrestrial sensors distributed over an area while the satellite is overflying the area. If multiple sensors attempt to transmit at the same time, this leads to so-called collisions, e.g., the transmitted data streams overlap in the radio channel and may no longer be read by the satellite.

Algorithms are known for detecting collisions on radio links. As soon as a collision is detected, the algorithms cause the communication partners to send their data packets in a coordinated manner. However, the disadvantages are the losses during the first collision, and delays due to the coordination and repetition of the transmission operation.

SUMMARY AND DESCRIPTION

The aim of the disclosure is therefore to develop an approach that performs the transmission of sensor data from multiple sensors to a satellite as efficiently as possible. In particular, collisions caused by simultaneously transmitting sensors are to be avoided or the resulting adverse consequences at least mitigated.

The scope of the present disclosure is defined solely by the appended claims and is not affected to any degree by the statements within this summary. The present embodiments may obviate one or more of the drawbacks or limitations in the related art.

The method for transmitting sensor data from multiple sensors to a satellite includes communication of available registration time slots by the satellite to all sensors within radio range that are eligible for sensor data transmission.

The method further includes selecting one of the communicated registration time slots by each of the above-mentioned sensors.

The method further includes transmitting a registration message to the satellite by the respective sensor in the selected registration time slot, wherein the registration message contains a system-wide unique identifier of the sensor.

The method further includes storing the identifier of the sensor and the current position of the satellite at which the satellite is located when the registration message is received, by the satellite.

The method further includes confirmation of a completed registration to the corresponding sensor by the satellite.

The method further includes transmitting a request message to each registered sensor by the satellite for requesting sensor data, wherein the request message contains a reception period during which the satellite is ready to receive the sensor data of the corresponding sensor, wherein the specification of the reception period chosen by the satellite is based on the registration time slot chosen by the respective sensor, wherein alternatively the satellite sends a common request message to a plurality of sensors, in which it specifies a separate reception period for each of the plurality of sensors for receiving the sensor data.

The method further includes transmitting the sensor data to the satellite by the respective sensor within the reception period specified for it in the request message.

In contrast to the prior art, in which measures are taken only after a collision of the data streams transmitted simultaneously to the same satellite by two sensors, the method attempts to prevent such collisions in advance. This is achieved by the satellite actively coordinating the transmission of the sensor data. Specifically, in a first phase, (which is also designated hereafter as the registration phase), the satellite registers the sensors in question and allocates each of them a time window for transmitting their respective sensor data. In a second phase, (which is also designated as the transmission phase), the satellite requests the sensor data from the individual sensors in a directed manner, namely according to a list prepared by the satellite during the registration phase.

The registration phase may include: communicating the registration time slots, selecting a registration time slot, transmitting a registration message, storing the identifier and the current position, and confirming a completed registration.

The transmission phase may include transmitting the request message and transmitting the sensor data.

Variants of this basic concept are possible. For example, in certain cases, a sensor may send its sensor data to the satellite during the registration phase, e.g., when the amount of data to be transmitted is small, as explained in detail below.

The method for transmitting sensor data from multiple sensors may therefore be understood as a method for coordinating the transmission of the sensor data.

For the sake of simplicity, the coordinated transmission of sensor data from multiple sensors to one satellite is described below. However, the disclosure may in principle also relate to sensor data being transferred to multiple satellites. If the system includes multiple satellites, the registration and transmission phases are carried out for all participating satellites.

In the context of this patent application, a sensor is understood as an electronic device with an apparatus for communication with a satellite. The apparatus is configured to such that it is capable of receiving signals/messages and transmitting signals/messages to and from the satellite. This also includes, for example, the knowledge of the corresponding radio frequencies, any access keys, or the knowledge of the "unique ID" (UID) with which each geostationary or earth-orbiting satellite may be uniquely identified.

The sensor provides data that is intended to be sent to a satellite. As a rule, it is provided that the satellite, in turn, forwards the received data to a ground station immediately or at a later point in time. For example, the ground station may be a (e.g., central) server, a plant with a processing unit, or another sensor.

The sensor has sufficient storage capacity to store the above data until there is a possibility of transmitting the sensor data to a satellite. In particular, the sensor stores the sensor data until the sensor receives a corresponding request message from a satellite.

The sensor has an identifier that is unique system-wide. "Unique system-wide" means that it uniquely identifies the respective sensor from all other sensors potentially communicating with the satellite.

Advantageously, all eligible sensors for a particular satellite have a transmission channel with the same essential characteristics. This has the advantage that multiplex methods such as frequency multiplexing, time slots or codes are not required.

Advantageously, the sensor has an internal clock that is synchronized with the time of the satellite.

Furthermore, it is advantageous if the sensor is able to determine when it is expected to be within radio range of the satellite. The advantage of this is that the sensor is not kept permanently on standby to receive the request message from the satellite, rather the sensor calculates in advance when the satellite in question will approach it and then (and only then) deliberately switches on. Thus, the sensor avoids being on standby for most of the time, only to watch for the moment when a satellite approaches the sensor in radio range. Instead, the sensor switches on selectively when it expects a satellite to fly over at sufficient distance. This aspect is described in detail in the European Patent Application No. 19178817.3.

The satellite periodically flies over the area in which the sensor, which for the sake of simplicity is assumed to be stationary, is located. Depending on the flight altitude and orbit of the satellite, an overflight occurs more or less frequently (from several times a day to once every few days). It is also possible that multiple satellites will periodically fly over the same area. In this case, the request for the sensor data may be coordinated in such a way that the sensors concerned are requested either by one or the other satellite to transmit their sensor data.

The period of time during which a sensor is in radio range of a particular satellite depends, inter alia, on where the sensor is located in the coverage area (footprint) of the satellite. This period, also known as the contact time window, may be 5-45 minutes at a time when the sensor is at the center of the footprint.

Just as the sensor is equipped with an apparatus for communication with the satellite, the satellite similarly has an apparatus for communication with the sensor.

The transmission device of the communication apparatus is advantageously designed as a so-called "broadcast".

This means that a transmitted message may be read by all sensors in the reception range.

In addition, the communication apparatus of the satellite is configured in the same way as the communication apparatus of the sensor, such that it is capable of receiving signals/messages and sending signals/messages to and from the sensors. This also includes, for example, knowledge of the corresponding radio frequencies or any access keys.

The following text contains a detailed description of the individual acts of the method. They may be, but do not necessarily need to be, carried out in the sequence recited in the claims.

During the registration phase, the satellite registers the sensors in question and allocates each of them a time window for transmitting their respective sensor data. This phase may also be understood as a learning phase, in which the satellite learns which sensors are available where on its orbit.

Firstly, the satellite will communicate the available registration time slots to all sensors within radio range that are eligible for the transmission of sensor data.

This may be carried out, for example, by a detection signal, which is also designated as a "beacon" in the technical jargon. If the detection signal is emitted in the form of a "broadcast", it may of course also be received by other sensors not designed for the reception of sensor data with this satellite. The wording that the satellite sends the available registration time slots to all sensors within the radio range which are eligible for the transmission of sensor data may therefore be understood to mean that the registration time slots are communicated at least to all sensors within the radio range which are eligible for the transmission of sensor data.

In one embodiment, a registration time is initially determined. This is the period of time (duration) that is expended on the registration during an overflight time over a specific area. For example, if the overflight time (flyby time) is 30 minutes, the registration time may be set to 5 minutes. In this case, after a five-minute registration period, the remaining 25 minutes may be used to request the sensor data. Alternatively, the entire flyby time may also be determined at the time of registration and the sensor data may only be requested in a further overflight of the satellite over the area.

Furthermore, the available registration time slots are specified. For example, in the above example of the five-minute registration time, it may be specified that there are 300 registration time slots, wherein a registration time slot begins at each full second during the registration time and ends at one tenth of a second before each full second (in this example, each registration time slot thus lasts nine tenths of a second). This information about the available (here: three hundred) registration time slots is communicated to the sensors, for example, by a periodically emitted beacon.

Each of the sensors then selects one of the communicated, (e.g., potentially available), registration time slots. The selection may be random, for example, by generating a random number associated with a specific registration time slot. In the selected registration time slot, the sensor sends a registration message to the satellite. The as minimum information that the registration message contains is an identifier of the sensor (unique identifier, UID), with which the sensor may be identified by the satellite on a system-wide basis.

If no other sensor has chosen the same registration time slot, thus no other sensor has also sent a registration message to the satellite during the same period, the registration of the sensor was successful. When the registration message arrives, the satellite stores the sensor's unique identifier as well as its own current position. The latter is important because in the registration phase, the satellite not only defines a sequence in which it requests the sensor data during the transmission phase, but also, in an advantageous way, also learns which sensors are located where and when on its orbit.

As a final act in the registration phase, the satellite confirms to the corresponding sensor that its registration was successful. This is important because otherwise the sensor would not know whether its dispatched registration message reached the satellite intact or whether there might have been a collision with another registration message from another sensor. If multiple sensors in the receiving area generate the same random number, there will be a collision. In this case, the process would have to be repeated in the next registration phase.

To reduce the likelihood of identical randomly selected registration time slots, in certain embodiments, more registration time slots than sensors may be made available. For example, the 300 registration time slots are in this sense well suited for 100 sensors in the footprint of the satellite.

The number of registration time slots provided by the satellite may also be chosen dynamically depending on the number of eligible sensors that may be used for transmission of sensor data: if the number of sensors in a certain area changes, the number of registration time slots would then be adjusted or changed.

In another embodiment, random numbers that are not assigned to any available registration time slot are also intentionally allowed. If a sensor generates such a random number, no successful registration is possible, and it would have to try again for a registration time slot in the next registration phase. The advantage, however, is that the probability of collision for registration messages is reduced. This embodiment is therefore particularly attractive when more sensors are available than registration time slots.

In another embodiment, the sensor knows its own position. If it is a stationary sensor, its position may be easily specified during an initialization, for example. Alternatively, the sensor may determine its position using a global positioning system (GPS). If the beacons emitted by the satellite contain trajectory parameters (e.g., in the TLE format), the sensor may also estimate its own position based on these (as described in European Patent Application No. 19178817.3).

In any case, it is possible that the sensor, knowing its own (approximate) position, may calculate whether it is currently at the beginning, in the middle, or at the end of its flyby time window (contact time window) with respect to the corresponding satellite. A sensor may thus influence the choice of the registration time slot and thus, if necessary, place the range of its transmission request in the middle or the end of the flyby time window, in order to give sensors that fall out of the contact window earlier time to send their data. If the sensor detects collisions, the sensor's own strategy may then be adjusted in further overflights.

In an advantageous embodiment, a sensor performs the acts for registration with a satellite only once (for that satellite).

As already mentioned, depending on such factors as the flyby time and the number of sensors requesting to transmit, the entire flyby time in a first overflight may be used for the registration or, in certain cases, even multiple overflights may be used only for the registration of all eligible sensors before the satellite requests sensor data from the registered sensors. Alternatively, a period of time which is small in comparison to the flyby time may also be used as the registration time. In this case, a majority or even all available sensor data may be queried immediately in the first overflight.

If the amount of data that is to be sent as sensor data from a sensor is so small that it may be fully transmitted within the registration time slot, the sensor may also send all sensor data available at that time to the satellite together with its registration message.

By default, the sensor data is transmitted when requested or prompted to do so by the satellite. For this purpose, the satellite sends a dedicated request message to each registered sensor. The request message contains the communication of a reception period during which the satellite is ready to receive the sensor data of the corresponding sensor. The specification of the reception period is based on the registration time slot selected by the respective sensor.

In the simplest case, the reception period that the satellite communicates to the sensor by the transmitted request message may read as follows: "It is possible to receive your sensor data from now on, and for up to no more than 20 seconds from now." However, the start of the reception period might only be in the future; the request message would then read accordingly: "It will be possible to receive your sensor data starting one minute from now and then for a maximum of 20 seconds." Any significant signal or data transmission times may advantageously be taken into account in determining the reception period.

Alternatively, it is also possible that the satellite does not send a separate request message to each sensor individually with the reception period relevant to it, but instead sends a common request message to multiple sensors, in which it specifies a separate reception period for receiving the sensor data for each of the multiple sensors.

The satellite may offer the individual sensors reception periods during which the sensors are within radio range of the satellite.

Although this is not mandatory, the order in which the satellite sends request messages and offers reception periods to each sensor may correspond to the registration time slots selected by the sensors from the registration phase. On the basis of this principle, the satellite would query the list of sensors registered at the current location in sequence (e.g., the list lists the individual sensors according to their chosen registration time slots) and receive the corresponding sensor data in sequence.

If a very large number of sensors want to send a lot of data to the satellites, the satellites may also extend the data collection phase, (e.g., the transmission phase), to multiple overflights.

If the requested sensor has to transmit data to the satellite, it sends it during the offered reception period. If it does not have any data to transmit, it may also inform the satellite of this in a specific embodiment. In this variant, if there is no answer, the satellite would conclude that the corresponding sensor (for whatever reason such as failure, relocation, etc.) is no longer available. The satellite may then release the assigned reception time window, (e.g., the assigned reception period), and assign the window to another sensor on the next overflight.

In another embodiment, the satellite confirms a successful transmission of sensor data to the corresponding sensor in the next request message directed to this sensor. This has the advantage that if no confirmation is received, the sensor knows that the previously transmitted sensor data has not arrived at the satellite. It would then try to send the sensor data again at the next request. If no subsequent request reaches it from the satellite at all, the corresponding sensor may re-register with the satellite in the next registration phase and then send the failed sensor data to the satellite.

Advantageously, a transmission phase is directly followed by a new registration phase at regular or irregular intervals. Whether already registered sensors need to re-register is left open. In any case, with a new registration phase, newly added sensors may be given the opportunity to register with the corresponding satellite or satellites as well, in order to be allocated reception periods in the future. In this case, the system may be described as a self-learning one.

The sensor may also be either stationary or mobile.

If the sensors are stationary, the time slot for the registration may be kept relatively short, so that, if necessary, all sensors would only be registered (e.g., learned) by the system, (e.g., by the satellite or satellites), after multiple overflights.

Mobile sensors may move out of the regions learned in the registration phase. This may lead to an increased need for registrations and the registration times will need to be adjusted accordingly. In this case, pointless requests also may be made. Overall, the efficiency of the method will suffer with very high mobility of the sensors, as very fast moving sensors may move quickly out of the footprint of the satellite.

In a further embodiment, the satellite and the sensors are configured to receive or transmit two different radio technologies or radio frequencies. The registration of the sensors with the satellite is then carried out by one radio technology or radio frequency and the request and the transmission of the sensor data are carried out on the other radio technology or radio frequency. This has the advantage that both phases may be performed independently of each other and, at least in some cases, simultaneously.

In summary, the method is a method that may be implemented on limited-resource sensors. Furthermore, the method is independent of the radio hardware used, e.g., independent of the layer-1 and layer-2 technology used for the satellite communication. As the method is a self-learning method, it is ultimately also flexible with regard to a changing number of sensors and a changing satellite configuration.

The disclosure also relates to a satellite capable of carrying out the method as described herein. This means that the satellite is configured to receive sensor data from multiple sensors, wherein the sensors register with the satellite and the registered sensors transmit their respective sensor data to the satellite at the request of the satellite. Specifically, the satellite is configured to communicate available registration time slots to all sensors located within radio range that are eligible for transmitting sensor data.

The satellite is further configured to store a system-wide unique identifier of a sensor and the current position of the satellite at which the satellite is located when a registration message of the sensor containing the identifier is received.

The satellite is further configured to confirm a completed registration of a sensor to the corresponding sensor.

The satellite is further configured to send a request message to each registered sensor for requesting sensor data, wherein the request message contains a reception period during which the satellite is ready to receive the sensor data of the corresponding sensor, wherein the specification of the reception period chosen by the satellite is based on the registration time slot chosen by the respective sensor, wherein alternatively the satellite may send a common request message to a plurality of sensors, in which it specifies a separate reception period for each of the plurality of sensors for receiving the sensor data.

The satellite is further configured to receive sensor data transmitted to the satellite by the respective sensor in the reception period specified for it in the request message.

As a rule, the satellite does not process and exploit the received sensor data itself but forwards it to a ground station. Examples of a ground station are a (e.g., central) server (of a higher-level system, a cloud, etc.), a plant with a processing unit, or another sensor. Depending on the connectivity between the satellite and the ground station, it may be advantageous if the satellite has a buffer to store the received sensor data. This allows it a certain degree of flexibility as to when it forwards the sensor data to the ground station.

Specific embodiments which were mentioned in the context of the method and which are also applicable to the satellite as such, are not mentioned here again separately in order to avoid repetition. In addition, for the explanation of the individual features of the satellite, reference is made to the above explanations of the corresponding method.

BRIEF DESCRIPTION OF THE DRAWINGS

The disclosure is illustrated in the following using the attached figures. The figures show exemplary and schematically selected embodiments without limitation to the scope of protection claimed.

FIG. 1 depicts sensors that are overflown by a satellite and are located inside or outside a radio field of the satellite, according to an embodiment.

FIG. 2 depicts sensors that are overflown by a satellite and are located inside or outside a first or second radio field of the satellite, according to an embodiment.

DETAILED DESCRIPTION

FIG. 1 depicts sensors 30 that are distributed in a specific area. FIG. 1 also shows a satellite 10 that flies over the sensors 30. The flight path of the satellite 10 is labeled with the reference sign 11.

The satellite 10 has a communication apparatus that allows it to emit detection signals (beacons) and receive registration messages from the sensors 30 during the registration phase. The range of the emitted detection signals is represented by the hatched radio field 20. As may be seen in FIG. 1, some of the sensors 30 are within radio range, (e.g., within the radio field 20), and some of the sensors 30 are outside the radio range. The sensors 30 located outside the radio field are drawn in dashed lines. If the satellite 10 continues to move on its flight path 11, the sensors 30 on the left in FIG. 1 will fall out of the radio field 20, while the sensors 30 on the right, currently still located outside the radio field 20, will come within the radio range of the satellite 10.

The satellite 10 is also configured to transmit request messages to the sensors 30 during the transmission phase and to allocate each sensor 30 a specific reception period during which it may send its sensor data to the satellite 10. In order to receive the request message, the respective sensor 30 is also located in the radio field 20 of the satellite 10.

Depending on the application, the contact window, (e.g., the period during which certain sensors 30 are located in the radio field 20 of the satellite 10), may now be used for registration and data retrieval. For example, some of the available time may be used as the registration phase and the rest of the time for requesting the sensor data. Alternatively, the entire flyby time may also be used for registration, (e.g., if the number of sensors to be registered is large compared to the flyby time), and sensor data from the registered sensors 30 may only be requested and transmitted in one of the subsequent overflights.

FIG. 2 illustrates a variant with two different radio frequencies or radio technologies. In a first radio field 21, the satellite 10 communicates the available registration time slots to the sensors 30 located in this radio field 21, whereupon the sensors 30 may register with the satellite 10 by selecting a registration time slot. Separately from the first radio field 21, there is a second radio field 22. The sensors 30 located in the second radio field 22 each receive a request message from the satellite 10 and each one is allocated a period of time during which they may send their sensor data to the satellite 10.

The different radio fields may be realized by different frequencies or else different radio technologies.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for transmitting sensor data from multiple sensors to a satellite, the method comprising:
communicating available registration time slots by the satellite to all sensors within radio range that are eligible for sensor data transmission;
selecting a registration time slot of the communicated registration time slots by each sensor of the sensors within the radio range;
transmitting a registration message by a respective sensor to the satellite in the selected registration time slot, wherein the registration message contains a system-wide unique identifier of the respective sensor;
storing, by the satellite, the system-wide unique identifier of the respective sensor and a current position of the satellite at which the satellite is located when the registration message is received;
confirming a completed registration to the corresponding sensor by the satellite;
sending, by the satellite, either: (1) a request message to a registered sensor for requesting sensor data, wherein the request message contains a reception period during which the satellite is ready to receive the sensor data of the registered sensor, and wherein specification of the reception period chosen by the satellite is based on the registration time slot chosen by the respective sensor, or (2) a common request message to a plurality of sensors, in which the common request message specifies a separate reception period for each sensor of the plurality of sensors for receiving the sensor data; and
sending the sensor data to the satellite by the respective sensor within the reception period specified for the respective sensor in the request message.

2. The method of claim 1, wherein a number of registration time slots is greater than a number of sensors within the radio range which are eligible for transmitting sensor data.

3. The method of claim 1, wherein the selecting of the registration time slot is a random selection.

4. The method of claim 1, wherein the sensor knows where the sensor is temporally located in a contact time window with the satellite, and the sensor selects the registration time slot using a temporary location in the contact time window.

5. The method of claim 4, wherein the sensor selects a registration time slot which is temporally located at an end of the contact time window of the sensor with the satellite.

6. The method of claim 1, wherein a sensor of the sensors within the radio range performs a registration on the satellite only once for the satellite.

7. The method of claim 1, wherein registration of a sensor in the satellite takes place in a first overflight of the satellite over the sensor and the sensor data is transmitted to the satellite in a subsequent overflight.

8. The method of claim 1, wherein the sensor sends the sensor data to the satellite at a time of the registration message when an amount of the sensor data is small enough to be transmitted during the registration time slot.

9. The method of claim 1, wherein the satellite determines the respective reception period per sensor, during which the sensor is ready to receive the sensor data of the corresponding sensor, in such a way that the corresponding sensor, based on information that the satellite stored when the registration message of the sensor was received, is located within the radio range of the satellite during the reception period.

10. The method of claim 1, wherein the sensor also responds to the satellite upon the request message of the satellite directed to the sensor, even when the sensor currently has no sensor data to transmit to the satellite.

11. The method of claim 10, wherein the satellite releases a reception time window assigned to a sensor from which no response is obtained, for reception time windows to be assigned to other sensors in a future.

12. The method of claim 1, wherein the satellite confirms a successful transmission of sensor data to the corresponding sensor in a next request message sent to the corresponding sensor.

13. The method of claim 1, wherein the satellite and the sensors within the radio range are configured to receive or transmit two different radio technologies or radio frequencies each, and registration of the sensors within the radio range with the satellite takes place by one radio technology or radio frequency of the two different radio technologies or radio frequencies and a request and transmission of the sensor data takes place on the other radio technology or radio frequency of the two different radio technologies or radio frequencies.

14. A satellite comprising:
a communication apparatus configured to receive sensor data from multiple sensors, wherein the sensors are configured to register with the satellite and the registered sensors are configured to transmit their respective sensor data to the satellite at a request of the satellite,
wherein the satellite is configured to:
communicate available registration time slots to all sensors located within radio range that are eligible for transmitting sensor data,
store a system-wide unique identifier of a sensor and a current position of the satellite at which the satellite is located when a registration message of the sensor containing the system-wide unique identifier is received,
confirm a completed registration of a sensor to the corresponding sensor,
send: (1) a request message to each registered sensor for requesting the sensor data, wherein the request message contains a reception period during which the satellite is ready to receive the sensor data of the corresponding sensor, wherein specification of the reception period chosen by the satellite is based on the registration time slot chosen by the respective sensor, or (2) a common request message to a plurality of sensors, in which the common request message specifies a separate reception period for each sensor of the plurality of sensors for receiving the sensor data, and receive the sensor data sent to the satellite by the respective sensor in the reception period specified for the respective sensor in the request message.

15. The satellite of claim 14, further comprising:
a buffer for storing the received sensor data.

16. The method of claim 1, wherein a number of registration time slots is at least 50% greater than a number of sensors within the radio range which are eligible for transmitting sensor data.

17. The method of claim 3, wherein the random selection comprises generating a random number.

* * * * *